United States Patent [19]
Fujita et al.

[11] Patent Number: 5,337,249
[45] Date of Patent: Aug. 9, 1994

[54] NUMERICAL CONTROL MACHINING ANIMATION WITH WORKPIECE AND TOOL MOVEMENT

[75] Inventors: Naoki Fujita; Teruyuki Matsumura; Koichi Murata, all of Yamanashi, Japan

[73] Assignee: Fanuc Ltd, Minamitsuru, Japan

[21] Appl. No.: 752,438

[22] PCT Filed: Dec. 14, 1990

[86] PCT No.: PCT/JP90/01644
 § 371 Date: Aug. 19, 1991
 § 102(e) Date: Aug. 19, 1991

[87] PCT Pub. No.: WO91/10179
 PCT Pub. Date: Jul. 11, 1991

[30] Foreign Application Priority Data
 Dec. 26, 1989 [JP] Japan .................... 1-337060

[51] Int. Cl.$^5$ .................... G06F 15/46; G05B 19/18
[52] U.S. Cl. .................... 364/474.22; 364/474.26
[58] Field of Search .................... 364/474.22–474.27, 364/191–193, 474.2

[56] References Cited
U.S. PATENT DOCUMENTS

| | | | |
|---|---|---|---|
| 4,633,409 | 12/1986 | Sekikawa | 364/474.22 |
| 4,639,855 | 1/1987 | Sekikawa | 364/188 |
| 4,821,201 | 4/1989 | Kawamura et al. | 364/474.2 |
| 4,994,977 | 2/1991 | Tsujido | 364/474.2 |
| 5,150,305 | 9/1992 | Sekikawa | 364/474.26 |

*Primary Examiner*—Joseph Ruggiero
*Attorney, Agent, or Firm*—Staas & Halsey

[57] ABSTRACT

A display method for a numerical control apparatus for simulating a machining by an animated display of such objects as a material shape, tool shape, or the like on a display screen, based on control information obtained from the numerical control apparatuses. For some actual machine tools, for example, only a tool is moved by the servo axis, or both a tool and a material are moved by the servo axes. Any one of a material shape (2) and a tool shape (3) to be moved is, therefore, specified and displayed on the display screen (1) of the numerical control apparatus so that the machining simulation is in accordance with the actual movements of the machine tools.

6 Claims, 6 Drawing Sheets

NUMERICAL CONTROL MACHINING ANIMATION WITH WORKPIECE AND TOOL MOVEMENT

BACKGROUND OF THE INVENTION

1. Field of the Invention

The present invention relates to a method used in a numerical control apparatus for displaying objects such as the shapes of materials and tools contained in machining programs for numerical control apparatuses, and more particularly to a method used in numerical control apparatuses for displaying objects which are moved together with the servo axis during a machining simulation.

2. Description of the Related Art

Some numerical control apparatuses to control machine tools display animation of a simulation of machining by machine tools on a CRT screen connected thereto, based on the shapes of the materials and tools contained in the machining programs. However, in conventional simulation, numerical control apparatuses can display only the movements of tools for machining materials on the display screen.

The following is a description of a conventional machining simulation, with reference to the drawings. FIGS. 4 and 5 illustrate display screens of a conventional numerical control apparatus. a tool shape 3. The material shape 2, one end of which is fixed by a chuck, rotates in the direction of the C-axis, and the tool shape 3 shifts together with the servo axis in the directions of the X-axis and the Z-axis. Therefore, the shift of the tool shape 3 in the directions of the X-axis and the Z-axis, and the machining thereby of the material shape 2 according to the machining program, is displayed on the display screen 1 as machining simulation. Namely, the tool shape 3 is shifted from the position shown in FIG. 4, in the directions of the X-axis and the Z-axis, to the position shown in FIG. 5. The display of the material shape 2, on the other hand, shows only the rotation thereof in the direction of the C-axis when cut by the tool shape 3 and, the relative positional relationship therebetween on display screen 1 is not changed.

In practice, however, with some actual machine tools such as a compound and a multi-system lathe, the tool and the material shift independently. For example, the tool is shifted in the direction of the X-axis but the material is shifted in the direction of the Z-axis. When a machining is simulated based on a machining program of a numerical control apparatus for controlling such machine tools, as shown in FIGS. 4 and 5, the tool is used to move in the direction of the Z-axis, instead of moving the material in direction of Z-axis, and therefore, a machining movement different from an actual machining movement is simulated by such conventional numerical control apparatuses.

SUMMARY OF THE INVENTION

The present invention has been developed in consideration of such circumstances, and an object thereof is to provide a display method for a numerical control apparatus which is capable of simulating a machining in which the tool and material shapes can be shifted in accordance with the actual movement of the machine tool.

According to the present invention, to solve the above problems, there is provided a display method for a numerical control apparatus for simulating a machining by an animated display of such objects as material shape, tool shape or the like on a display screen, based on control information obtained from the numerical control apparatus, and is characterized in that the display method comprises a step of arbitrarily specifying an object to be shifted on the display screen by combining the object with a servo axis to thereby shift the object.

In practice, with some machine tools, for example, only the tool is moved by the servo axis, or both the tool and a material are moved.

Therefore, an object to be shifted on the display screen can be arbitrarily specified by combining a material shape, tool shape or the like displayed on the display screen of the numerical control apparatus with a servo axis, to shift same by software with which the numerical control apparatus is provided, so that a machining simulation can accurately follow the actual movements of the machine tools.

DESCRIPTION OF THE PREFERRED EMBODIMENT

An embodiment of the present invention will now be described with reference to the drawings.

Figure 3:
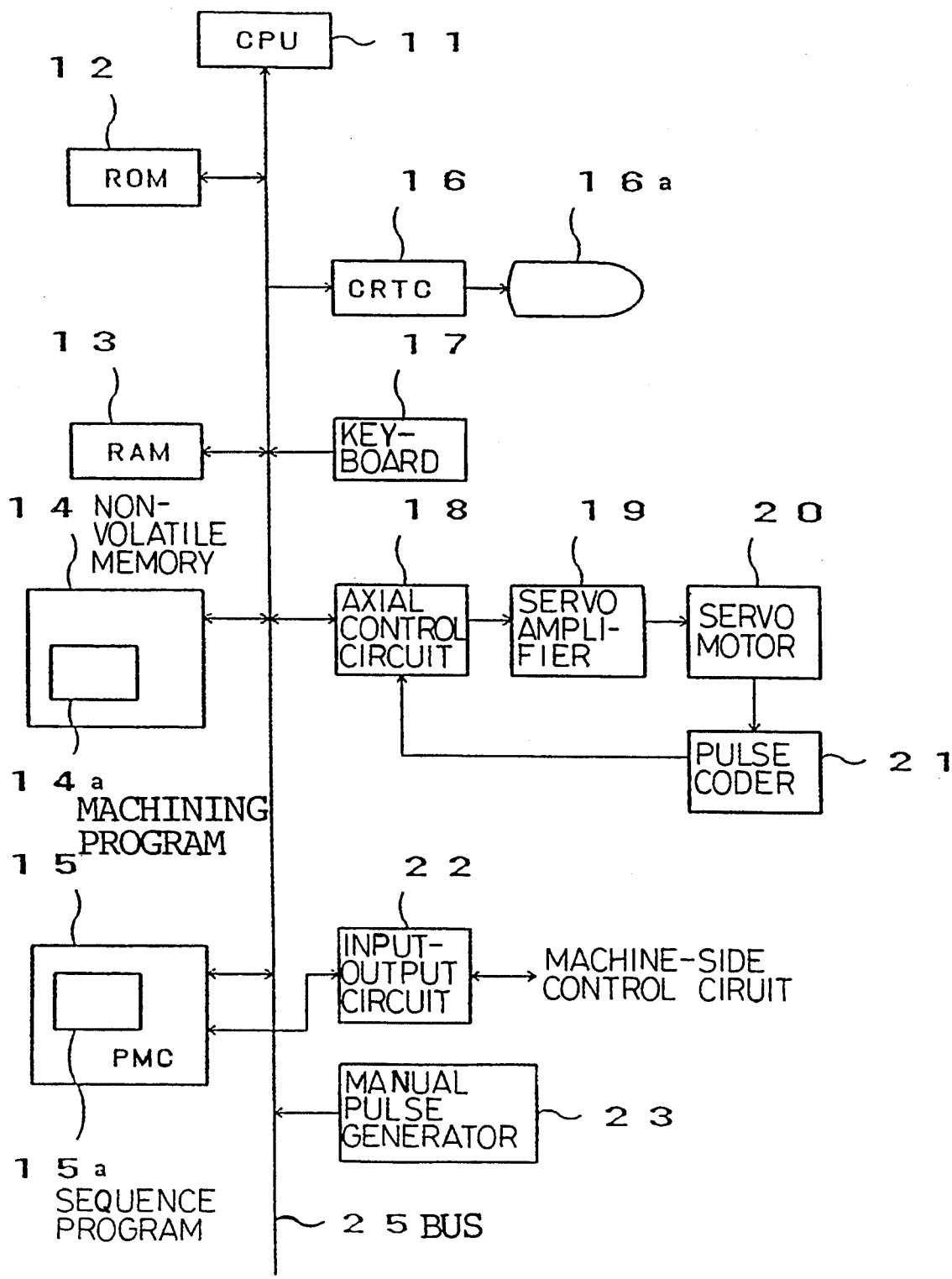
FIG. 3 is a diagram showing a schematic construction of the numerical control apparatus according to the embodiment of the present invention.

FIG. 3 is a schematic view of the construction of the numerical control apparatus according to the embodiment of the present invention, wherein a processor 11 controls the movements of the entire numerical control apparatus in accordance with the system program stored in a ROM 12, which is an EPROM or EEPROM. The RAM 13 is an SRAM, and input/output signals and various image data for image processing are stored in this RAM 13. A CMOS memory backed-up by a battery is used for a nonvolatile memory 14, and thus parameters, pitch error correction amounts and tool correction amounts are stored therein and are retained after the power thereto is turned off.

A PMC (programmable machine controller) 15 receives such commands as M, S and T functions via a bus 25, and interprets these commands by using a sequence program 15a, and then outputs signals for machine tool control, via an input/output circuit 22, to the machine tool. Also, the PMC 15 receives input signals, such as a limit switch signal from the machine side, an input signal from a switch of the machine operation panel, or the like and processes these signals by the sequence program 15a. The results of the process are transferred to the RAM 13 via the bus 25, and are read by the processor 11.

A graphic control circuit (CRTC) 16 converts digital signals into signals for display, and sends the signals to an indicator 16a. The indicator 16 comprises a CRT or a liquid display which displays the shapes of a material and the product as machined, machining definition screens, a display of the position of each axis, and the state of input and output signals, parameters, and the like. The keyboard 17 is used for inputting various kinds of data for operating the machine tool.

An axial control circuit 18 receives a positional command from the processor 11 and outputs a speed command signal to servo amplifier 19 for controlling a servo motor 20. The servo amplifier 19 amplifies the speed command signal to drive the servo motor 20, and the servo motor 20 is connected to a pulse coder 21 which outputs position feedback signals, which are fed back as a positional feedback pulse to an axial control circuit 18. Instead of the pulse coder 21, a position transducer such as a linear scale may be used. These elements are provided for each of a number of axes in practice, but only an element for one axis is shown in the figure as the configuration of each element is the same.

The input/output circuit 22 receives and sends input and output signals from and to the machine side, i.e., receives limit switch signals from the machine side and switch signals from the machine operation panel, which are read by the PMC 15. Also, the circuit 22 receives output signals from the PMC 15 for controlling the pneumatic actuator, etc., on the machine side, and outputs these signals to the machine side.

A manual pulse generator 23 outputs a pulse train to move each axis according to a precise rotational angle, so that the machine can be precisely positioned. The manual pulse generator 23 is usually mounted on the machine operation panel. These components are linked to one another by the bus 25.

In FIG. 3, components such as spindle amplifiers and spindle motors are omitted, and further, it should be noted that more than one processor can be used, to thus form a multi-processor system.

Figure 1:
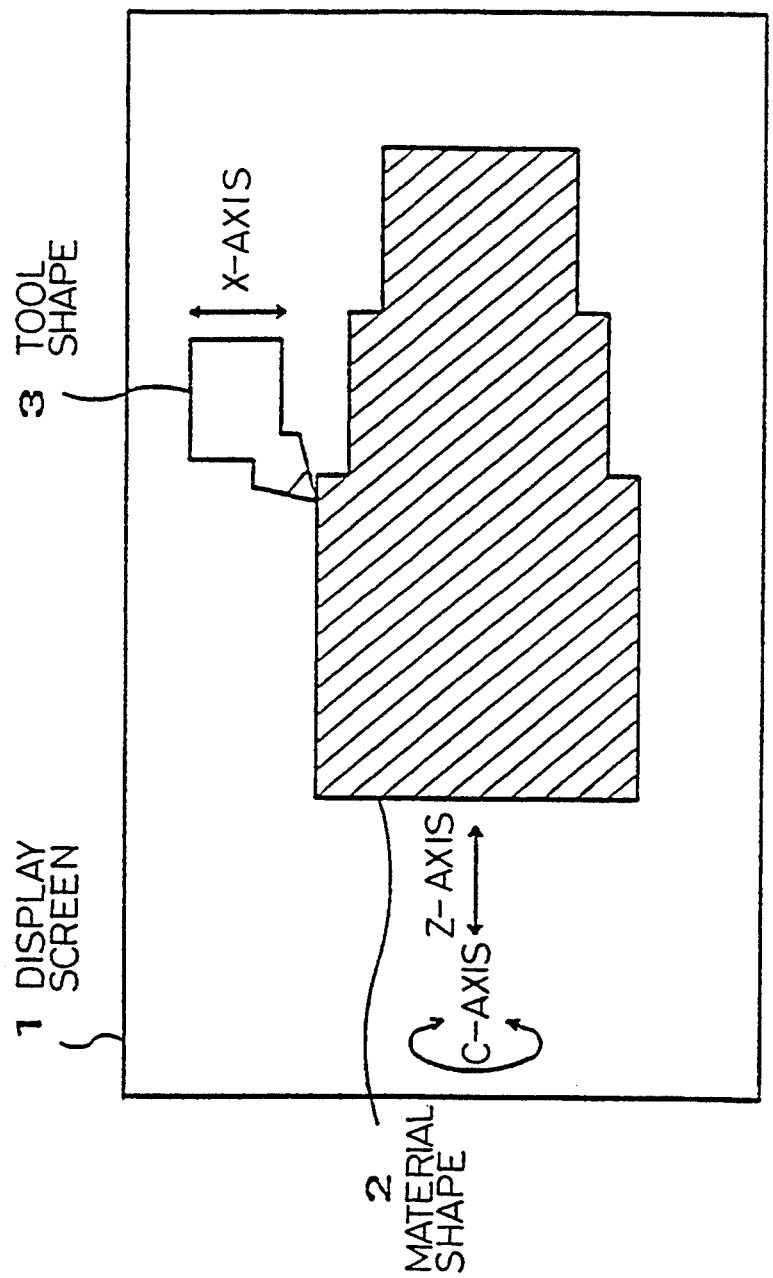
FIGS. 1 and 2 are diagrams showing display screens provided by the display method for numerical control apparatuses according to an embodiment of the present invention.
Figure 2:
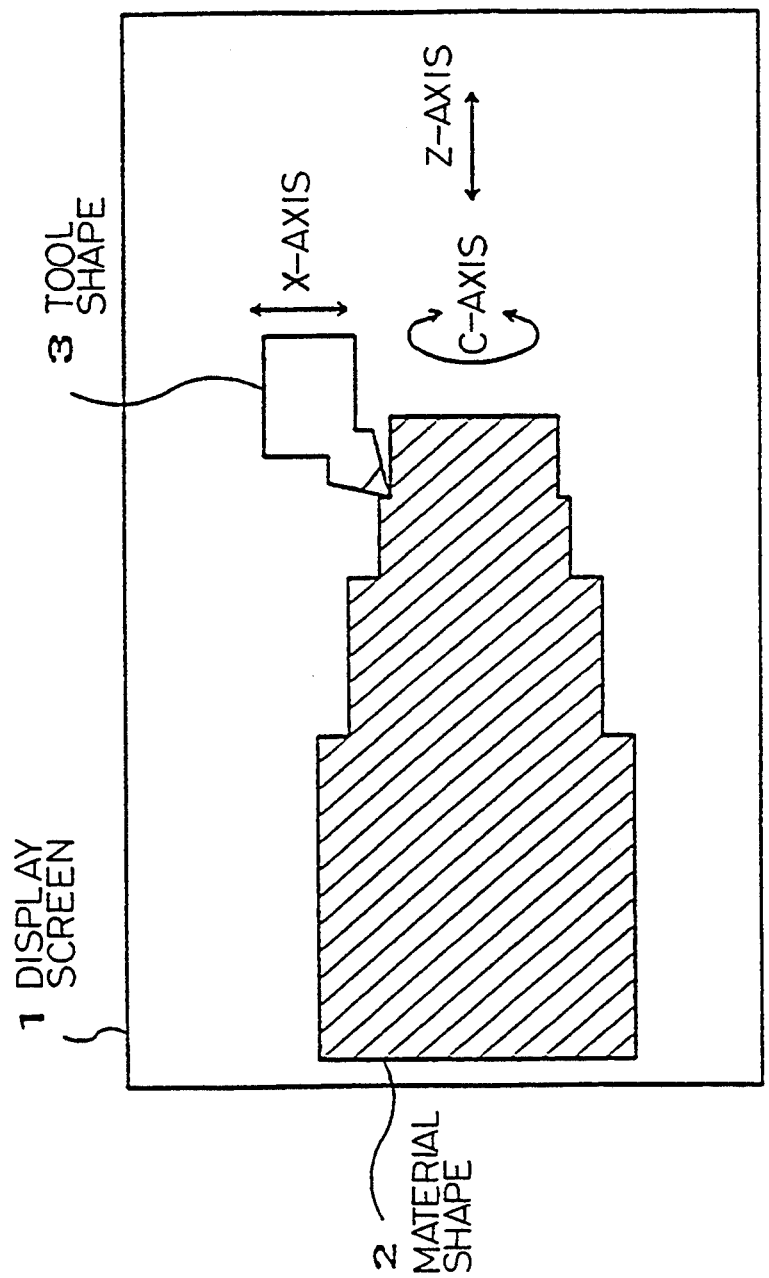
Figure 6:
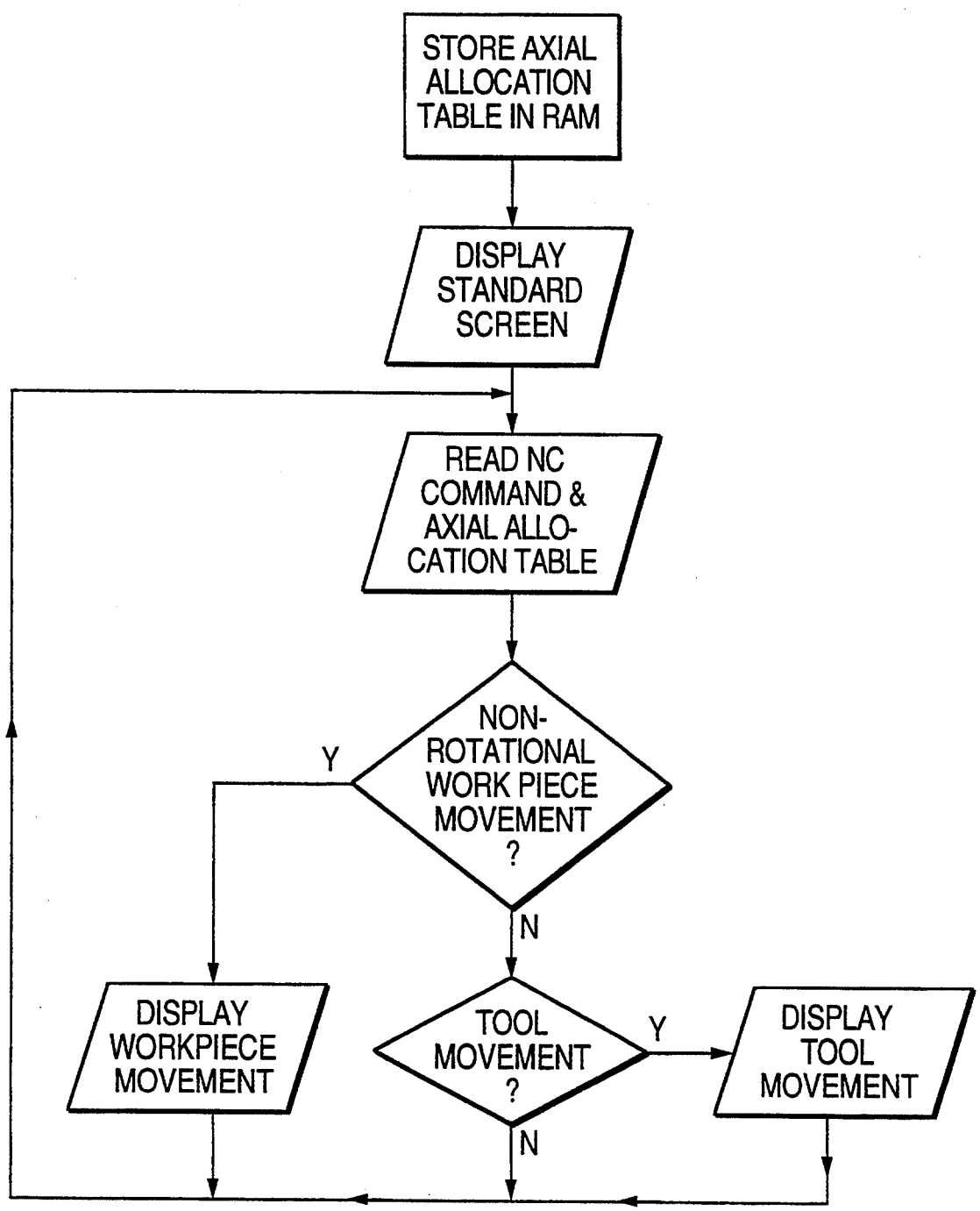
FIG. 6 is a flowchart of a display method according to the present invention.

FIGS. 1 and 2 illustrate display screens using the display method for the numerical control apparatus according to the embodiment of the present invention illustrated in FIG. 6.

A material shape 2 and a tool shape 3 are displayed on display screen 1. The material shape 2, one end of which is fixed by the chuck, rotates in the direction of the C-axis and is shifted in the direction of the Z-axis. The tool shape 3, however, is moved by the servo axis only in direction of the X-axis. Therefore, the tool shape 3 and the material shape 2 are shifted in the direction of the X-axis and Z-axis, respectively, in accordance with the machining program, and the machining of the material shape 2 is displayed on the display screen 1 as a machining simulation. Namely, in FIGS. 1 and 2, the tool shape 3 is shifted vertically and the material shape 2 is shifted horizontally on the display screen 1, following the movements of the actual machine tool.

Therefore, to change the display on the display screen 1 shown in FIG. 1 to the display on the display screen 1 shown in FIG. 2, the tool shape 3 is shifted upward in the direction of the X-axis, the material shape 2 is moved to the left in the direction of the Z-axis, and the tool shape 3 is shifted downward in the direction of the X-axis.

According to the present embodiment, the machining of the material shape 2 by the tool shape 3 is shown as realized by the actual machine tool, and thus the machining can be simulated in a manner that closely resembles the movements of the actual machine tool.

It is difficult to recognize the material shape 2 when it is rotating in the direction of the C-axis on the display screen 1, and therefore, the relationship between the individual servo axes (X-, Z- and C-axis) on the display screen 1 can be displayed with arrows as shown in FIGS. 1 and 2. This enables the relationship between each servo axis and a shifting object to be easily recognized on the screen.

The relationships among the material shape, tool shape, and the servo axes are shown in the following axial allocation table. This table is stored in the RAM 13 in the numerical control apparatus.

| Servo axis | Axial Allocation Table | |
|---|---|---|
| | Tool mobile lathe A | Material mobile lathe B |
| 1 (X) | Tool | Tool |
| 2 (Z) | Tool | Material |
| 3 (C) | Material | Material |

In the above table, the tool shift in both the tool mobile lathe A and material mobile lathe B is in the direction of the X-axis, and the material shift in both lathes is in the direction of the C-axis. With respect to the Z-axis, however, the tool shifts in the tool mobile lathe A but the material shifts in the material mobile lathe B. Therefore, the servo axes can be allocated according to movements of an actual machine tool.

Figure 4:
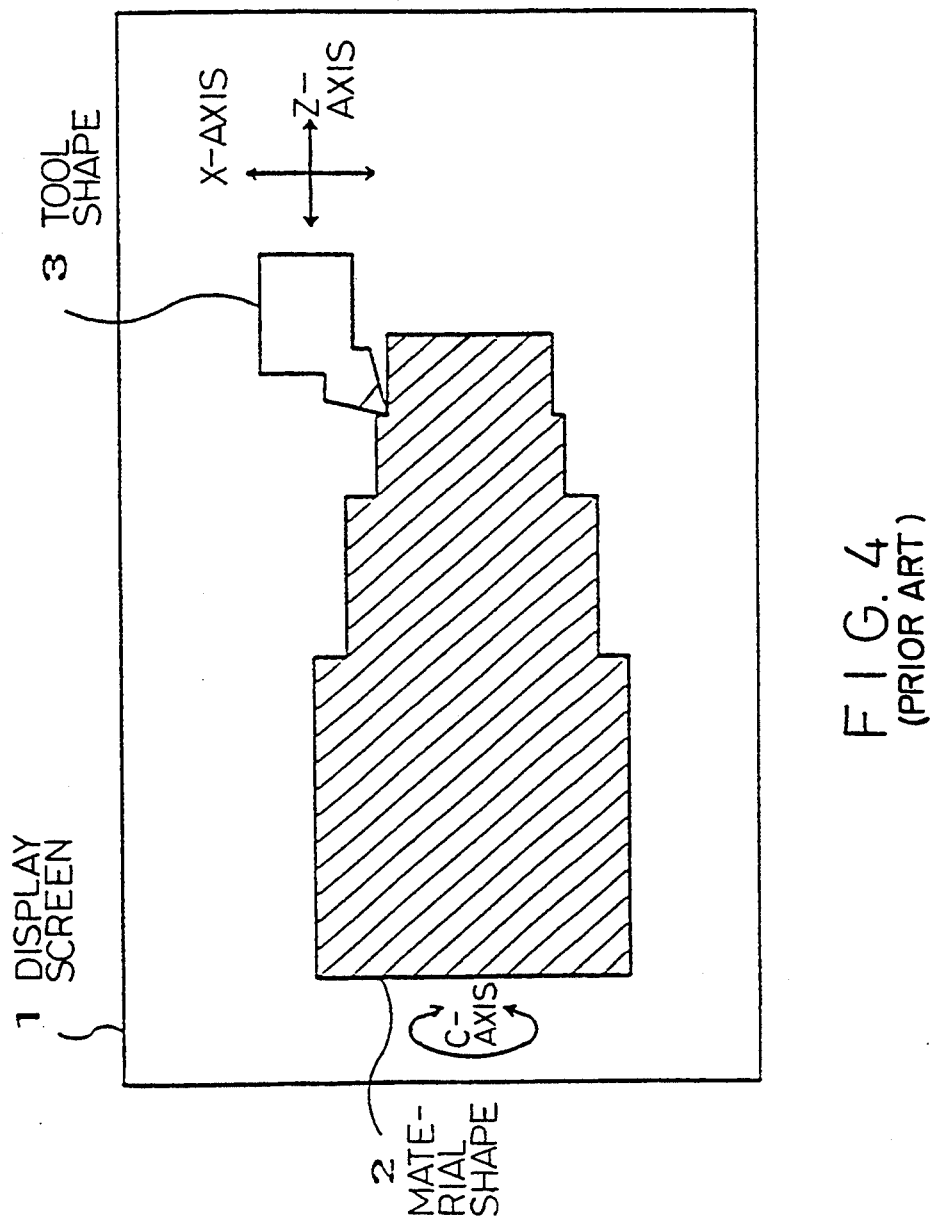
FIGS. 4 and 5 are diagrams showing a display screen of a conventional numerical control apparatus.
Figure 5:
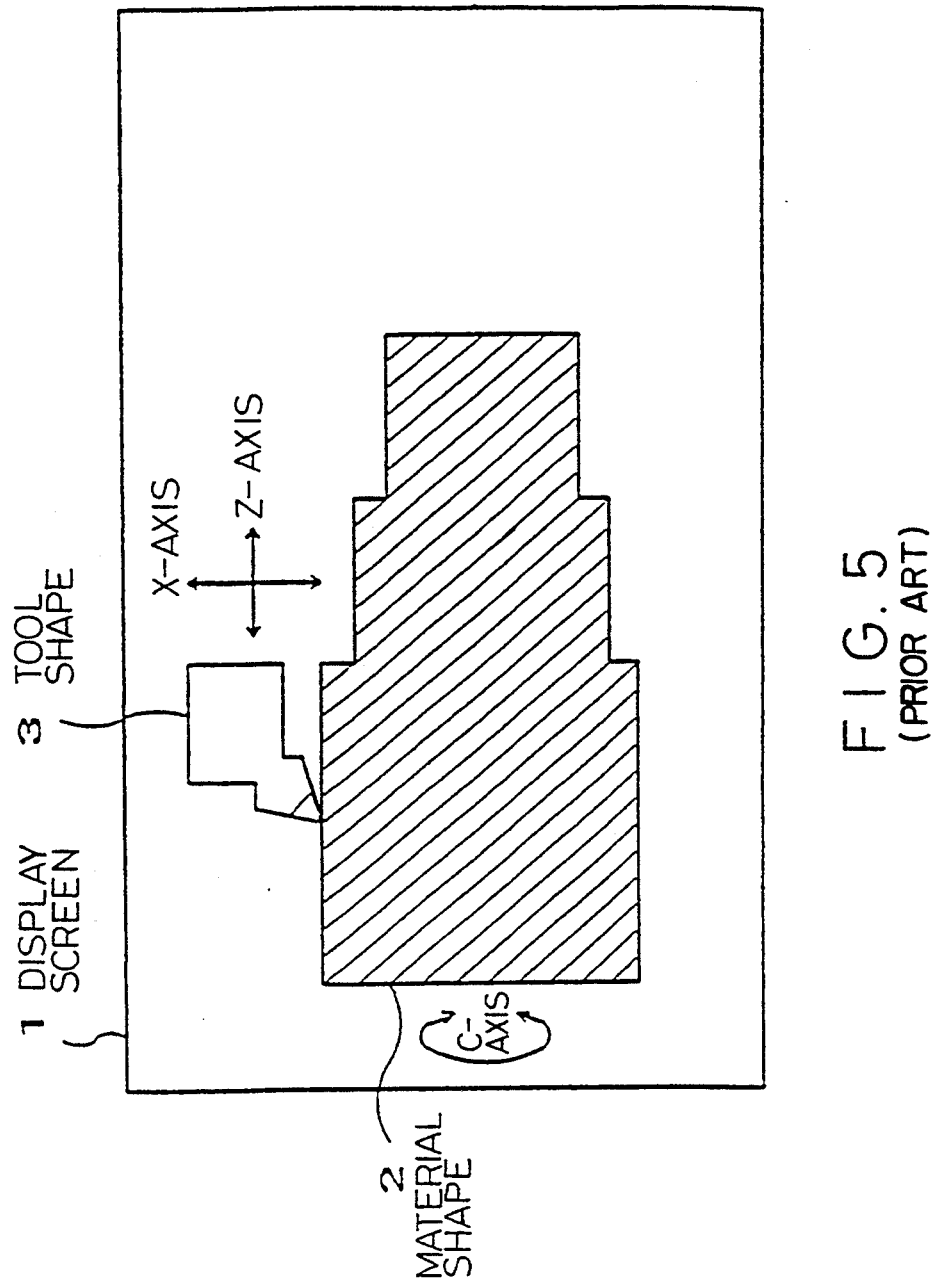

As apparent from this axial allocation table, the tool mobile lathe A is selected by parameters for lathes with which only a tool is moved by the servo axis, as shown in FIGS. 4 and 5. On the other hand, the material mobile lathe B is selected by parameters for lathes with which both a tool and a material are moved by the servo axes as shown in FIGS. 1 and 2. This table shows only examples, and several types of combinations can be prepared according to the number of servo axes of a machine tool, and parameters can be set according to movements of the machine tool.

As stated above, the present invention enables a machining to be simulated so that a tool shape and a material shape are shifted according to the movements of an actual machine tool.

What is claimed is:

1. A display method for a numerical control apparatus for simulating machining by an animated display, comprising the steps of:
   (a) displaying a material shape and a tool shape on a display screen, based on control information obtained from the numerical control apparatus:
   (b) arbitrarily specifying either of the material shape and the tool shape to be shifted on the display screen in a direction corresponding to a servo axis; and
   (c) repeating step (a) to indicate movement in dependence upon said specifying in step (b).

2. A display method for numerical control apparatuses according to claim 1, further comprising the step of (d) displaying an arrow indicating the servo axis corresponding to said specifying of movement in step (b).

3. A method of simulating numerical control machining of a workpiece by a tool, comprises the steps of:
   (a) storing an axial allocation table indicating which of the tool and the workpiece is capable of movement corresponding to each servo axis; and
   (b) simulating machining of the workpiece by the tool by displaying animated movement of the tool and the workpiece in dependence upon the axial allocation table.

4. A method according to claim 3, wherein said simulating in step (b) comprises the steps of:
- (b1) receiving numerical control commands from a machining program;
- (b2) determining by reference to the axial allocation table which of the tool and the workpiece is to be moved in response to each numerical control command instructing movement; and
- (b3) shifting a displayed position of one of the tool and the workpiece in dependence upon said determining in step (b2).

5. A method of simulating numerical control machining of a workpiece, comprising the steps of:
- (a) receiving numerical control commands from a machining program;
- (b) determining whether each numerical control command instructs movement of the workpiece other than rotational movement; and
- (c) displaying movement of the workpiece on a display screen in dependence upon each numerical control command determined in step (b) as instructing non-rotational movement of the workpiece.

6. A method according to claim 5, further comprising the steps of:
- (d) determining whether each of the numerical control commands instructs movement of a tool; and
- (e) displaying on the display screen movement of each tool determined as instructed to move in step (d), and wherein said determining in steps (b) and (d) includes comparing an axis of movement indicated in each numerical control command instructing movement with an axial allocation table to determine which of steps (c) and (e) should be performed for each numerical control command instructing non-rotational movement.

* * * * *